Figure 1:
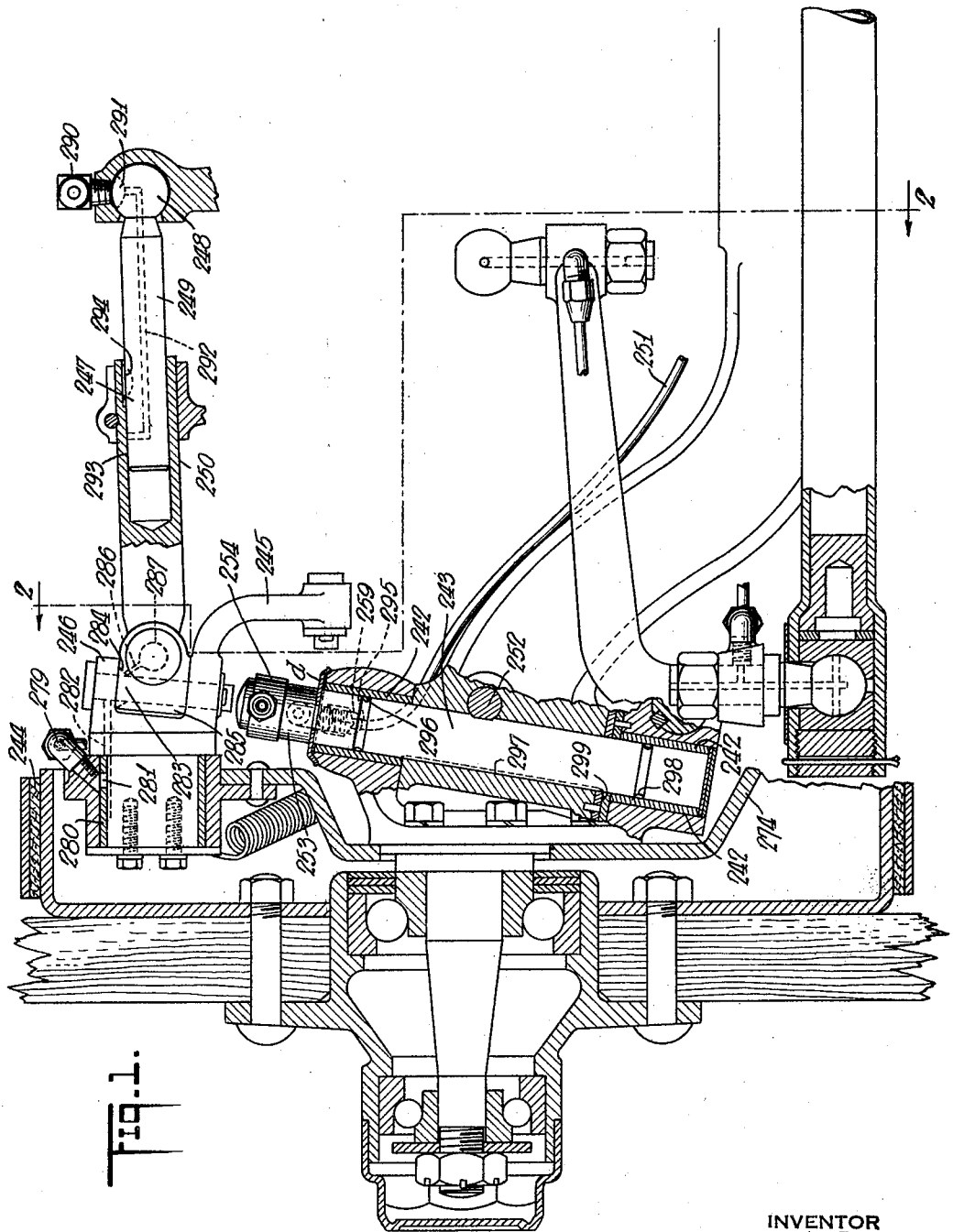

Nov. 29, 1932.    J. BIJUR    1,888,970
CHASSIS LUBRICATION
Original Filed Nov. 5, 1923    4 Sheets-Sheet 1

INVENTOR
Joseph Bijur
BY
ATTORNEYS

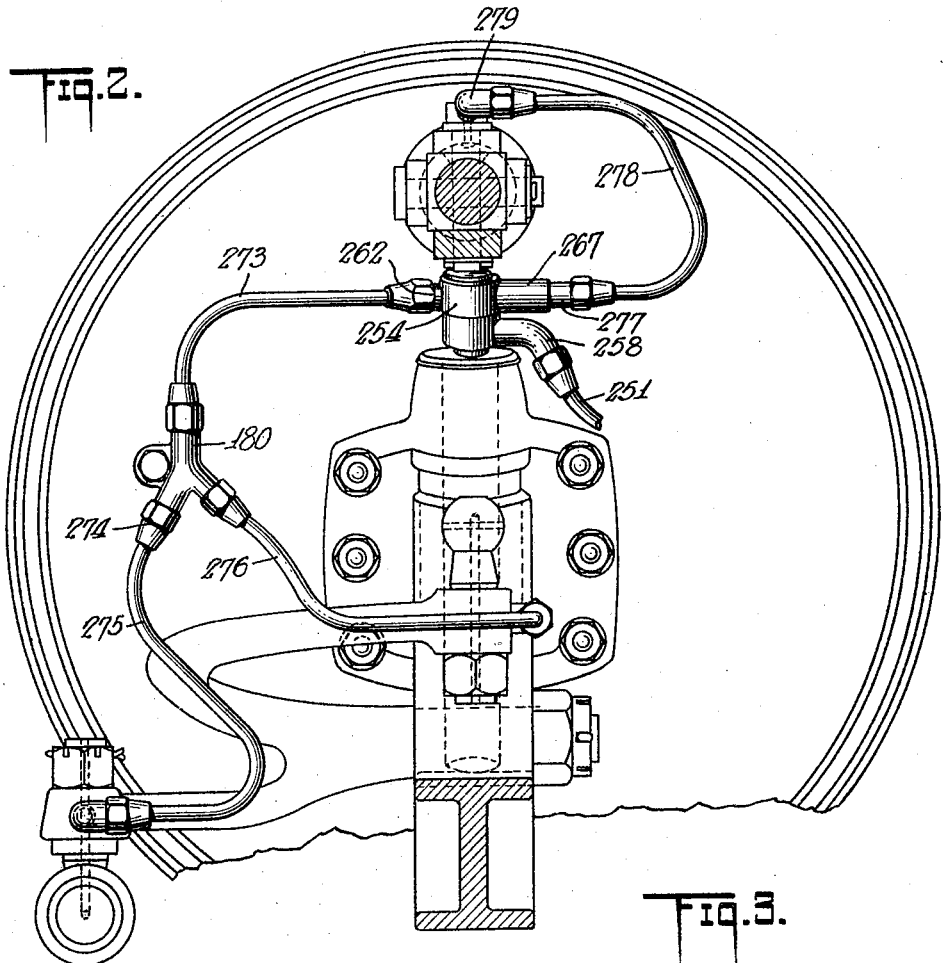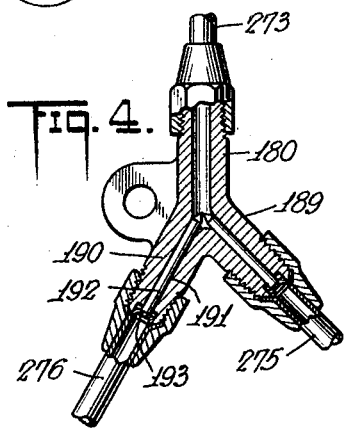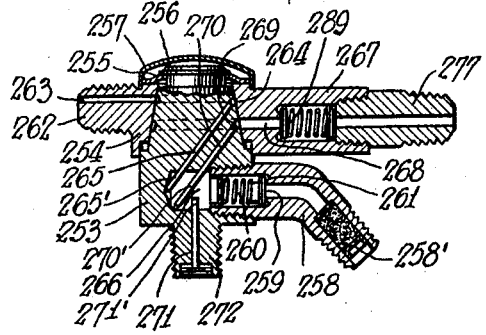

Nov. 29, 1932.    J. BIJUR    1,888,970
CHASSIS LUBRICATION
Original Filed Nov. 5, 1923    4 Sheets-Sheet 3
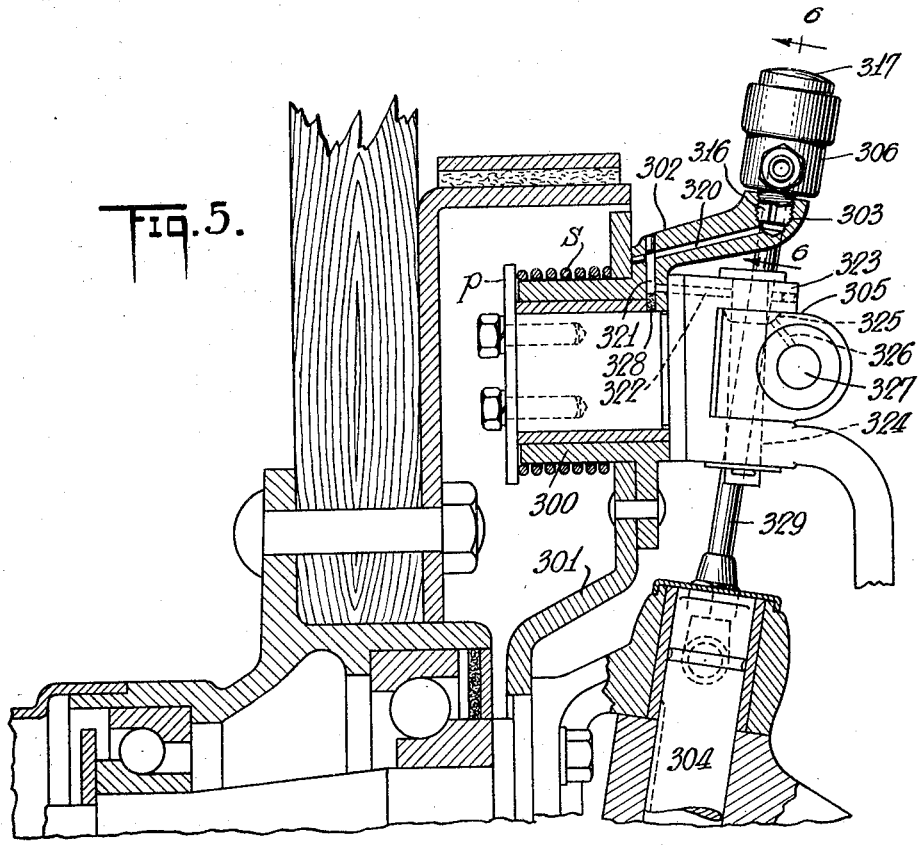
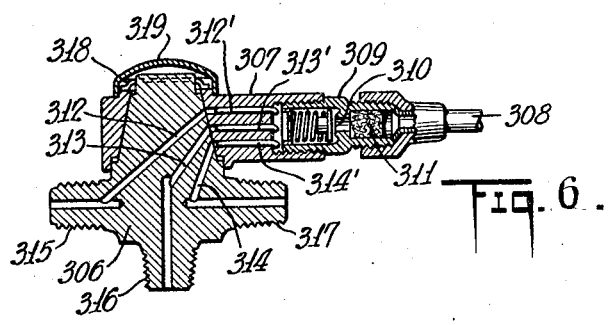
INVENTOR
Joseph Bijur
BY
ATTORNEYS

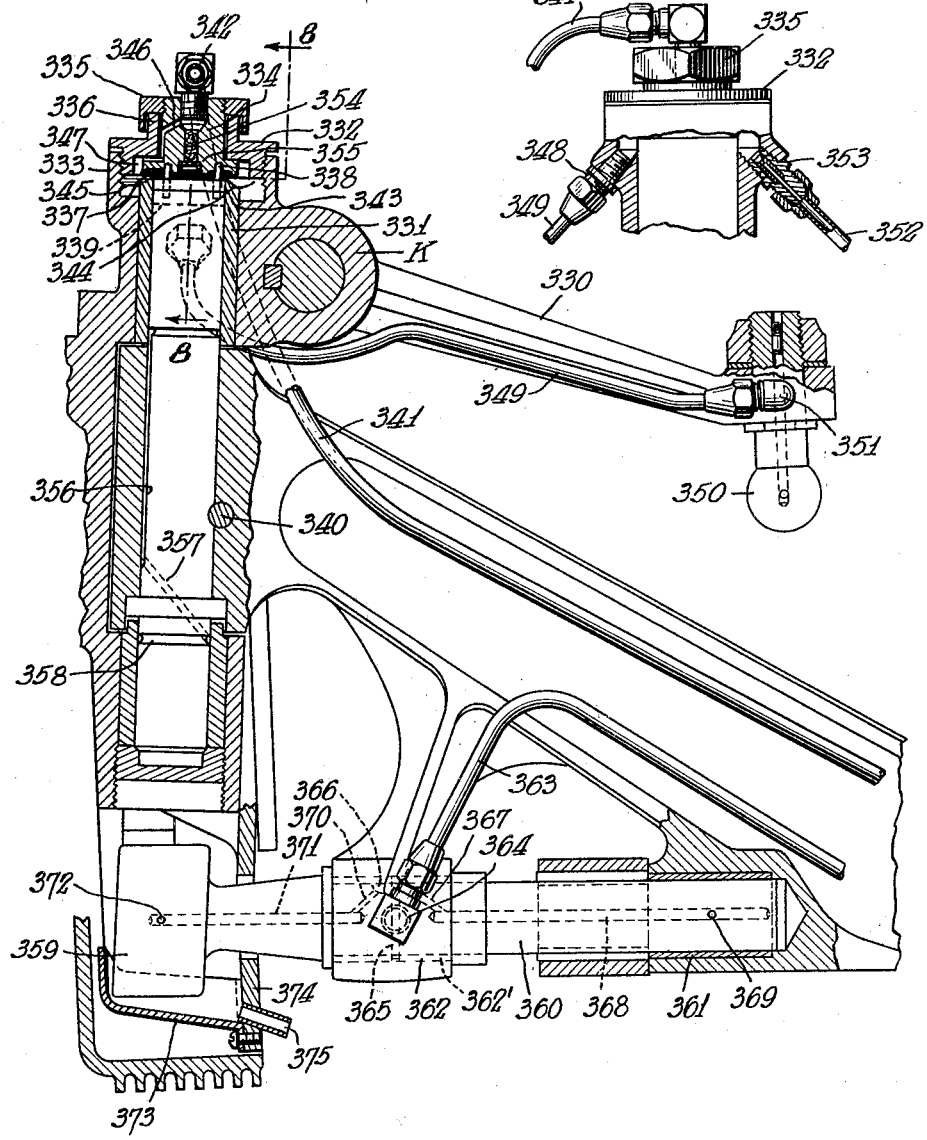
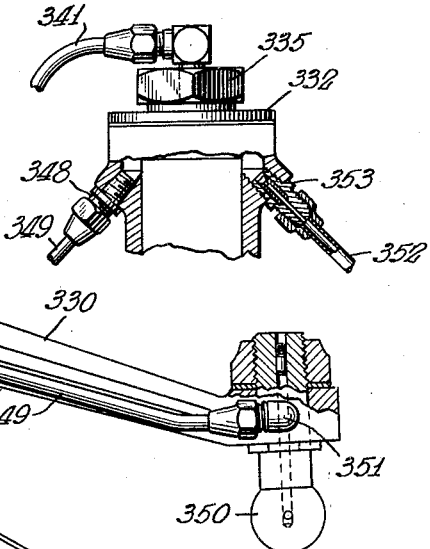

Patented Nov. 29, 1932

1,888,970

UNITED STATES PATENT OFFICE

JOSEPH BIJUR, OF NEW YORK, N. Y., ASSIGNOR TO AUTO RESEARCH CORPORATION, A CORPORATION OF DELAWARE

CHASSIS LUBRICATION

Original application filed November 5, 1923, Serial No. 672,870. Divided and this application filed June 8, 1929. Serial No. 369,403.

My present invention relates to lubrication, particularly to lubrication of automobile chassis, and is more especially concerned with the lubrication of the bearing or wearing surfaces associated with a structure such as the front wheel knuckle, which has both pivotal and/or longitudinal movement in respect to the structure carrying the lubricant supply or inlet. The present invention is especially concerned with the lubrication of the king pin bearings, the tie rod and drag link bearings, the wear surface of the brake bearings and the various bearings or parts of the brake operating member which are associated with front wheel knuckles.

The invention in a preferred application is concerned with the lubrication of the elements referred to, designated generically the "front wheel control appurtenances" and if desired, also the front wheel spindle, by operation from the chassis, and in one aspect is concerned more especially with the conduit construction and arrangement, by which the lubricant is passed to the knuckle.

The knuckle supply conduit system, it is apparent, should accommodate the pivotal or steering movement of the knuckle relative to the axle, and its rise and fall relative to the frame, which occurs as the springs flex during travel of the vehicle. My invention has among its objects to provide a serviceable conduit system of low cost, which is easy to install on any of a wide variety of vehicles, which provides for the relative movements above described, which is not subject to whipping, which remains tight even for relatively high lubricant pressure and which is substantially proof against rupture or leak from vibration of the moving vehicle even in hard usage. My invention provides a conduit system in the above relation, the parts of which are not likely to be bent or broken off by the usual impacts encountered in ordinary usage, and which, while accommodating the various relative movements without undue strain at any part thereof, is, nevertheless, mechanically so strong and is retained in place upon the vehicle structure so securely as not to be torn loose by the driving of the vehicle through brush or bushes, which will suffer no substantial injury from pelting by ice or loose stones that may be thrown up from the road by the movement of the vehicle thereon, which will not be torn off or damaged by mud frozen thereunto, and which will not be disturbed by handling as by removing mud in cleaning the vehicle.

The invention from another aspect is concerned with the local distribution of lubricant from the knuckle inlet to the various bearings associated with the knuckle.

The invention is shown embodied in the steering knuckle of a motor vehicle and provides convenient means for reliably supplying with clean oil all, or any number of the bearings carried by or associated with said knuckle and without the need for selective manipulations or direct manual access to the individual bearings, and without the use of any protruding or projecting conduits likely to be torn loose in ordinary use of the vehicle.

The knuckle inlet and the various control bearings are all substantially unitary with the knuckle, and preferably bores and rigid metal connecting pipe, extend through and along structural parts of the knuckle from the inlet to the bearings. In the embodiments shown the bearings are supplied in parallel from the knuckle inlet, which serves as the distributor and may have flow control appurtenances to assure correct division.

The knuckle inlet may be disposed in convenient location immediately above the king pin to supply lubricant by gravity flow to the various bearings, which are at lower level. If any of the bearings or parts to be lubricated as, for instance, the brake operating shaft, is at a level higher than the king pin, the knuckle inlet may in one embodiment, be mounted on the knuckle, coaxial with the king pin and at a level well thereabove, so that even the highest of the bearings may receive oil by gravity flow from the inlet. In another embodiment, the knuckle inlet may be disposed immediately above the king pin and below the brake operating shaft, pipes from the inlet leading to the various bearings, and appropriate flow control means assuring upward flow from the knuckle inlet to the brake operating shaft and simultaneously therewith, downward flow to the bearings at lower level.

The present application is a division of my copending application Serial No. 672,870, filed November 5th, 1923.

In the drawings—

Fig. 1 is a view in longitudinal cross-section indicating means for lubricating front wheel brake, or other knuckle control bearings, Fig. 2 is a sectional view taken along the line 2—2 of Fig. 1, Fig. 3 is a view on an enlarged scale indicating the swivel shown in Figs. 1 and 2, Fig. 4 is a view on an enlarged scale in longitudinal cross-section illustrating the dividing fitting shown in the assembly of Fig. 2, Fig. 5 is a fragmentary view generally similar to Fig. 1 of a modification, Fig. 6 is a sectional view taken along the line 6—6 of Fig. 5, Fig. 7 is a view generally similar to Fig. 1 of another embodiment, Fig. 8 is a fragmentary sectional view taken along the line 8—8 of Fig. 7.

In Figs. 1 to 4 is shown one embodiment for lubrication of knuckle control appurtenances including any or all of the tire rod, steering arm and brake cam control bearings, as well as the king pin bearings. I have illustratively shown the invention applied in this case to a knuckle unit employing ordinary bearings 242 for the king pin 243. An external brake 244 for the front wheel is illustrated, said external brake being operated through an arm 245, formed integral with the clevis 246 of the universal joint at the knuckle end of the brake operating shaft. The brake operating shaft has a universal ball and socket joint 248 at the chassis end and is formed of telescoping parts 249—250, in order to accommodate the relative displacement of the knuckle and the chassis frame in operation of the vehicle.

In this embodiment, the lubricant is supplied to the knuckle from a conduit 251 on the axle rather than directly from the chassis frame. The conduit 251 may be supplied from a central lubricating system and receive a proportionate lubricant supply through a flow metering device, such as a drip plug of the type shown and described in my Patents Nos. 1,632,772, 1,734,027 and 1,732,828. It will be understood, of course, that if the source of lubricant is on the chassis the connecting conduit leading to axle conduit 251 may be arranged to flex with one of the vehicle springs in manner fully disclosed in my copending application, Serial No. 627,953, filed March 27, 1923.

The king pin 243 being pinned as at 252, as a stationary unit with the axle, the axle conduit 251 may be connected to deliver to a fitting 253 rigidly fixed as by threading into the top of the king pin 243, the lubricant being supplied from said plug to the various bearings through a knuckle inlet or distributer member 254 substantially unitary with the knuckle. In the preferred embodiment shown, the stationary plug fitting 253 constitutes the male element of a swivel unit, of which the distributer member 254 constitutes the female or collar element. The plug fitting 253 clamps a dust cap $d$ against the top of the king pin substantially as in Fig. 1. Referring to Fig. 3, the swivel unit is maintained assembled by a spring washer 255 about the plug and interposed between the top of the collar fitting and a split ring 256 about the plug. A cap 257 snap-fitted over the collar member 254 prevents the entry of dust into the swivel.

The axle conduit 251 is connected to the plug by an inlet elbow 258 threaded thereinto, provided with a strainer plug 258'. A relief valve 259 is pressed by a spring 260 against valve seat 261 in fitting 258 to maintain the pipe 251 normally closed against entry of air or escape of lubricant. The collar member 254 has a nipple 262 with an outlet duct 263 which communicates with a peripheral groove 264 about the swivel plug, said groove supplied through an oblique bore 265 communicating with a well 266 in the bottom of the plug. A second nipple 267 is provided on the collar member 254 and diametrically opposite nipple 262, and has a duct 268, which communicates with a second peripheral groove 269 about the plug, in turn, connected by a bore 270, extending obliquely through the swivel plug to the well 266. In a preferred embodiment, the well 266 also communicates through a bore 271 in the swivel support nipple 272 to supply lubricant to the king pin bearings. In order to assure reliable distribution of the lubricant through the three courses, restriction pins 265', 270' and 271' approximately $\frac{1}{16}''$ in diameter, are lodged in the corresponding bores, providing a clearance only in the order of about .004''.

The outlet nipple 262 communicates through pipe 273 with the dividing or Y fitting 180, which is secured to the brake shield 274 and from which pipes 275 and 276 lead to the respective tie rod and steering rod bearings. The nipple 267 supplies lubricant through a fitting 277 and a pipe 278, the latter extending upward and delivering through an outlet fitting 279 at the upper surface of bearing 280 of the brake operating shaft (see also Fig. 2). Lubricant thus admitted, passes through aperture 281 and along an oil conveying groove 282 in the shaft, to the universal bearing pin 283, thence to a collecting bevel 284 in the hub 285, about the pin 283, from which an oblique duct 286 passes lubricant to the other pin 287 of the universal joint.

To prevent draining of lubricant from the upwardly extending conduit 278 with entry of air into the pipe system, a check valve 289 is preferably provided in the nipple 267, said valve being of construction similar to valve 259, previously described.

Pipe 278 being mounted rigidly at its upper end 279 with respect to the knuckle and pipe 273 being mounted rigidly at the dividing fitting 180, which is rigid with the knuckle, and said pipes being of relatively stiff seamless metal tubing, the ends of said pipes at the swivel collar nipples 267 and 262, will move as a unit with the knuckle and said swivel collar will, therefore, be rotated freely about the swivel plug 253 in conformity with the pivotal or steering movement of the knuckle.

The chassis end of the operating shaft is preferably lubricated from a fitting 290 which may be a drip plug, delivering into a well 291 at the upper end of the ball 248, from which the lubricant flows through a longitudinal duct 292, to empty at the sliding bearing 293 between the two shaft elements 249 and 250. In this case also, a key 294 between the shaft elements maintains the well 291 in proper registry with the inlet fitting 290.

In operation, lubricant pressure transmitted through pipe 251 will open relief valve 259 and will be transmitted through the body of lubricant that may be normally lodged within well 266 to be forced in parallel though the highly restricted passages determined by the three pins 265', 270' and 271'. Lubricant forced past pin 271' drips by gravity flow through a duct (not shown) in the king pin to be intercepted by groove 296 at the upper bearing end thereof, from which the lubricant spreads, the excess passing along longitudinal flat 297 to a groove 298, near the lower end of the king pin, from which groove the lubricant spreads to lubricate the lower king pin bearing. Some of the lubricant from flat 297 will also find its way into the thrust bearing 299 between the axle and the lower clevice jaw of the knuckle, upon which the weight of the vehicle rests.

Lubricant forced past pin 265' passes about the groove 264 through the nipple passage 263 into conduit 273 and is appropriately divided at the damming pins 192 in dividing fitting 180 for distribution to the steering rod and tie rod bearings in the manner previously described. As lubricant is forced past pin 270', it transmits pressure to unseat the valve 289, which sustains the column of lubricant normally confined in the upwardly extending pipe 278, thereby ejecting lubricant through fitting 279 to bearing 280, whence excess passes to the pins of the contiguous universal joint in the manner previously described.

Thus, the lubricant is admitted to the knuckle at a point on the axle thereof intermediate in level between the bearings to be lubricated, pressure being transmitted to said point to propel lubricant upward to the higher bearings and concurrently pass lubricant downward to the lower bearings. The inlet conduit being rigid with the axle, only the steering or pivotal movement of the knuckle need be accommodated, wherefore the simple swivel shown will answer although the universal swivel or joint shown in the parent application above referred to, may be employed.

Figs. 5 and 6 show a fragmentary view of a modification applied to a knuckle construction substantially identical with that shown in Figs. 1 to 4. In this embodiment, the swivel instead of being at a level intermediate between the king pin and the brake operating shaft, is disposed at level higher than all of said bearings, so that the latter can all be lubricated by gravity flow from the swivel. In this embodiment, as in that of Figs. 1 to 4, the bearing 300 for the brake operating shaft, is rigidly mounted on the brake shield 301, which latter, in turn, is rigidly mounted on the knuckle. The bearing 300, however, has an integral upstanding lug 302 provided with a screw socket 303 coaxial with the king pin 304 and above the universal 305. The knuckle inlet comprises the male or plug element 306 of a swivel threaded into socket 303 and, therefore, rotating about its own axis as a unit with the knuckle in the swiveling adjustments. The female or collar element 307 is supplied from the axle conduit 308 by which it is retained against rotation with the male element. A fitting 309 in the inlet end of the collar element is provided with a relief valve 310 of construction similar to those shown in Fig. 3 and with a strainer plug 311 in advance thereof. Parallel restriction pin outlets 312', 313', 314' generally similar to those in Fig. 3 are provided in the swivel collar 307 and communicate in turn respectively, with oblique ducts 312, 313 and 314 through the swivel plug. The oblique ducts deliver respectively to outlet nipple 315, support outlet nipple 316 and outlet nipple 317. As in the previous embodiment, the swivel collar 307 is secured by a snap ring 318 against separation from the swivel plug, the joint being kept dust-tight by a closure cap 319. The support nipple 316 delivers through a duct 320, which extends longitudinally through the oblique lug 302, thence downward as at 321 and outward through a bore 322 in universal joint clevis 323 to the pin 324, the excess being intercepted by bevel 325, whence it flows through duct 326 to the pin 327. The duct 321 communicates also with bearings 300, a dam 328 limiting the discharge to the latter, so that an adequate proportion of the charge will pass to the universal joint. Spring $s$ which encircles outer bearing element 300, reacts against plate $p$ secured to the end of the operating shaft and presses the base of clevis block 323 tight against said element to avoid excessive loss of lubricant in its traverse across the surfaces of contact between said element 300 and clevis block 323.

One of the nipples 315 communicates through a pipe (not shown) similar to that shown in Fig. 2, preferably with the tie rod and/or steering rod and the other nipple communicates through pipe 329 with the upper clevis of the knuckle to lubricate the bearings of the king pin, for instance, in manner described in connection with Fig. 1.

In this embodiment, as in that of Fig. 3, it will be seen that the pressure on the line is absorbed in the restriction pin or pins, in advance of the swiveling surface, so that the swivel need not be pressure-tight.

In Figs. 7 and 8 is shown another arrangement for the lubrication of knuckle control appurtenances. The present embodiment shows illustratively a knuckle of the general type that includes a steering arm 330 at the level of the upper knuckle clevis K, and a tie rod arm well below the knuckle and the axle, but not shown to avoid confusing the view. The knuckle inlet or lubricant distributer in this embodiment comprises a female or collar member 332 which member constitutes a cap threaded into a flange 333 at the upper end of the knuckle. The male or plug element 334 fits, if desired, with substantial clearance into a cylindrical opening in the collar member 332, and has a screw cap 335 threaded thereon at its upper end, overlapping the integral upward neck 336 on the collar or cap 332, thereby maintaining the parts in assembled relation with the flanged bottom 337 of the plug member, pressed upward against the corresponding surface of the collar or cap 332. The plug 334 may be maintained in fixed position with respect to the axle and the king pin by one or more pins 338 fitted into and projecting below the base thereof, downward into a transverse slot 339 in the head of the king pin, which is fixed at 340 with respect to the axle. The lubricant conduit 341 which delivers from the axle is connected to the head of the plug member 334, as through a drip plug 342 threaded directly thereinto. The plug member being retained as a rigid unit with the axle, no strain will, therefore, be transmitted to the conduit 341 as in the steering action of the knuckle.

The upper bushing 331 of the king pin protrudes upward as at 343 into the well 344 in the knuckle, thereby determining an annular trough 345 about the king pin. The trough 345 is supplied from the drip plug 342 by an oblique duct 346 through the plug element, delivering at 347 to the outside of bushing extension 343. Lubricant is drained from the trough 345 through one or more outlet fittings 348 supplying piping which may extend preferably along structural parts of the knuckle to the bearings thereon to be lubricated. The pipe 349, for instance, may extend along steering arm 330 to supply the steering rod bearing 350 through a fitting 351. A similar pipe 352 may extend from a second outlet 353 at the trough to supply the tie rod (not shown). A damming plug 354 as of felt, axially of the plug member 334 and held in place by a perforated friction cap 355 preferably limits the amount of oil passing directly downward to the king pin, so that the charge shall be correctly divided between that to the peripheral trough 345 for the tie rod and steering rod bearings and that to the king pin. The lubricant which has passed the damming plug 354, drips to the top of the king pin, whence it passes downward along the upper bearing 331 thereof, the excess lubricant passing lengthwise along the longitudinal flat 356 and through oblique duct 357 to the peripheral duct 358 near the top of the lower bearings, from which the oil spreads downward to lubricate the latter bearing. It will be seen that though there is substantial clearance between plug member 334 and the encircling collar or cap member 332, these elements coact to perform the functions of a swivel in the relation shown, the lubricant being delivered thereby without loss, from the axle to the knuckle.

In the present embodiment of knuckle, I have shown a brake control bearing of a well-known type differing from that shown in Fig. 1. In this case, the brake operating cam 359 is mounted rigid with the end of a cam shaft 360, which has bearings 361 and 362 in the axle and is operated from the chassis through an arm not shown. The cam 359 being substantially rigid with the axle, the universal or sliding adjustments shown in the brake embodiments of Fig. 1 are here eliminated, the steering action of the knuckle readily taking place about the relatively stationary cam, which is substantially at the pivot axis of the knuckle. The bearings 361 and 362 of the cam shaft and the wear surface of the cam 359 are preferably lubricated in this case from a conduit 363 along the axle, which conduit may be supplied simultaneously from the same pressure source as conduit 341. The conduit 363 is connected at bearing 362 by a drip plug 364 which delivers through a groove 365 around the outside of bushing 362′ into a well 366 near the upper side of the shaft. Lubricant is drained from well 366 through oblique duct 367 and bore 368 longitudinally of the shaft through a radial bore 369 therein, to lubricate the bearing 361. A similar oblique duct 370 is supplied from well 366 and communicates with a bore 371 axially of shaft 360 and extending to the cam 359, to supply lubricant to the wear surface of the latter through a duct 372 radially through the cam.

In this embodiment also, I have shown a sheet metal trough 373 secured to the brake shield 374 immediately below the cam to intercept any excess lubricant dripping therefrom, which lubricant escapes to the road through an outlet nozzle 375.

It will be understood, of course, that each of the various embodiments shown, may be equipped with means for supplying oil to the wheel spindle substantially in the manner shown in the embodiments of copending applications.

It is to be understood that the various conduit, swivel and felt or pin restriction arrangements described and shown in the present application may be broadly applied to lubricating installations other than those specifically adapted to knuckle lubrication.

As many changes could be made in the above construction, and many apparently widely different embodiments of this inventon could be devised without departing from the scope thereof, it is intended that all matter contained in the above description or shown in the accompanying drawings shall be interpreted as illustrative and not in a limiting sense.

I claim:

1. In a lubricating installation, in combination, a front axle, a front wheel knuckle having a pivot bearing on said axle, a brake shield mounted on said knuckle, a brake operating shaft extending transversely from the channel frame to said drum and having a bearing in said shield, said operating shaft including a universal joint contiguous to said bearing, said bearing having an integral lug extending upward therefrom, an oil distributer supported upon said lug coaxial with said king pin and above all of said bearings, an inlet to said distributer from a point on said axle and having a swiveling connection with respect to said distributer, and control means assuring predetermined distribution of lubricant through the outlets of said distributer to the various bearings supplied therefrom, one of the outlets comprising a duct through said bracket communicating with the contiguous bearing and having an outlet to one of the pins of said universal joint for supplying the latter, and a tap from said pin through the universal joint to the other pin thereof.

2. In a vehicle of the type comprising an axle, a steering knuckle having a clevis straddling said axle and a king pin rigid with said axle and constituting a pivot mount for said knuckle, a tie rod bearing on said knuckle, a brake, an operating shaft therefor bridging from the chassis to the knuckle, said shaft having a bearing in a part of said knuckle and a universal joint substantially in line with the king pin to accommodate the displacement of the knuckle relative to the chassis in operation; the combination therewith of a lubricant distributing swivel mounted upon said king pin coaxially thereof, outlets from said swivel extending therefrom along parts on said knuckle, one downward to said tie rod bearing and one upward to said operating shaft bearing, restriction means controlling the flow of lubricant through said outlets under the application of lubricant pressure to assure correct division between the tie rod and operating shaft bearings and ducts between the operating shaft bearing and the universal joint to drain some of the lubricant from the former to the bearings of the latter.

3. In a front wheel construction of the type including a knuckle having a king pin pivot mount, a tie rod arm rigid with said knuckle having a control bearing, a brake on said front wheel having a shield plate rigid with said knuckle and means for supplying lubricant to the king pin bearing and to the tie rod bearing comprising a lubricant distributer above the king pin, coaxial therewith and rigid with the knuckle with one outlet for flow of lubricant downward therefrom to the king pin and a second outlet and a pipe supplied therefrom extending along said brake shield and said tie rod arm to said tie rod bearing.

4. In a front wheel construction of the type including a knuckle having a king pin pivot mount, a tie rod arm rigid with said knuckle having a control bearing, a steering arm rigid with said knuckle and having a control bearing, a brake for said front wheel having a shield plate rigid with said knuckle and means for supplying lubricant to the tie rod and steering arm bearings comprising a lubricant supply fitting coaxial with the king pin and rigid with the knuckle, a dividing fitting mounted on said shield and connected to said supply fitting and conduits extending from said dividing fitting along said shield and along said tie rod and steering arms respectively to the corresponding bearings, said dividing fitting having dams therein to control the distribution of lubricant to the bearings supplied therefrom.

5. In a motor vehicle, in combination, a front wheel knuckle having a king pin pivot axis, a brake shield carried by said knuckle, brake operating means having a bearing mount in said shield and above said king pin and having an operating joint with bearings substantially at said pivot axis, a lubricant distributor rigidly mounted upon said knuckle at a level higher than all of said bearings, said distributor having outlets for gravity flow to the various bearings, one of said outlets extending to the brake operating means, and a draining connection from the latter to the bearings of the operating joint.

6. In a motor vehicle having a chassis, in combination, a front wheel knuckle, a king pin providing pivot bearings therefor, a tie rod bearing rigid with said knuckle, a brake shield on said knuckle, a brake operating means extending to the brake from the chassis and having a bearing supported by said shield, said brake operating means including an operating joint adjacent said bearing, a lubricant distributor carried by the knuckle at a level higher than all of said bearings, and gravity flow conduits extending from said distributor along said shield to the king pin and tie rod and brake operating means bearings.

7. In a motor vehicle of the type having a channel frame and including a front wheel knuckle, a king pin pivot mount therefor having bearings, a tie rod arm rigid with said knuckle having a bearing at its end, a brake associated with said front wheel, a shield for said brake rigid with said knuckle, an operating means for said brake extending from the channel frame through said shield and having a bearing supported by said shield and extending above said king pin; the combination therewith of means for lubricating the tie rod and the operating means bearings from a single source, said means comprising a lubricant distributor mounted on said knuckle below said operating means, outlet ducts from said distributor to the tie rod and operating means bearings, and means restricting the flow from said distributor to each of said two bearings.

8. In a front wheel construction of the type including, an axle, a knuckle, a pin constituting a pivot bearing therefor on said axle, a tie rod bearing rigid with said knuckle, a brake element carried by said knuckle and a cam with a bearing on said knuckle for setting the brake element; the combination therewith of lubricating means for said cam bearing and for the pivot and tie rod bearings upon said knuckle, said means including a distributing fitting carried by the knuckle unit and at a level higher than all of said bearings, and substantially upon the pivot axis of the knuckle, an inlet element having a swivel connection with respect to said distributing member, and a conduit supplying said inlet member with lubricant from said axle.

9. In a lubricating installation, in combination, a front axle, a front wheel knuckle having a pivot bearing on said axle, a brake shield mounted on said knuckle, a brake operating shaft extending transversely from the channel frame to said drum, having a bearing in said shield and including a universal joint contiguous to said bearing, an oil distributer supported upon said shield coaxial with said king pin and above said bearings, an inlet to said distributer from a point on said axle and having a swiveling connection with respect to said distributer and control means assuring predetermined distribution of lubricant through the outlets of said distributer to the various bearing surfaces on the knuckle supplied therefrom.

10. In a motor vehicle, in combination, an axle, a front or steering wheel knuckle carrying bearings, a king pin carrying bearings for pivotal connection between said axle and said knuckle, a swivel unit including an element coaxial with said king pin and movable with said knuckle, a complementary swivel element restrained against rotary displacement with respect to the axle, means for supplying said complementary member with lubricant from the axle and delivery conduit means rigid with said knuckle and connecting said swivel unit to said bearings, said complementary swivel element being provided with an inlet below the movable swivel element.

11. In a motor vehicle, in combination, an axle, a front or steering wheel knuckle carrying bearings, a king pin carrying bearings for pivotal connection between said axle and said knuckle, a swivel unit including an element coaxial with said king pin and movable with said knuckle, a complementary swivel element restrained against rotary displacement with respect to the axle, means for supplying said complementary member with lubricant from the axle, and delivery conduit means rigid with said knuckle and connecting said swivel unit to said bearings, said restrained swivel element being fixed in the top of the king pin.

12. In a motor vehicle, in combination, an axle, a front or steering wheel knuckle carrying bearings, a king pin carrying bearings for pivotal connection between said axle and said knuckle, a swivel unit including an element coaxial with said king pin and movable with said knuckle, a complementary swivel element restrained against rotary displacement with respect to the axle, means for supplying said complementary member with lubricant from the axle and delivery conduit means rigid with said knuckle and connecting said swivel unit to said bearings, said supply means including a rigid metallic inlet conduit extending from the axle to the swivel element.

13. In a motor vehicle, in combination, an axle, a front or steering wheel knuckle carrying bearings, a king pin carrying bearings for pivotal connection between said axle and said knuckle, a swivel unit including an element coaxial with said king pin and movable with said knuckle, a complementary swivel element restrained against rotary displacement with respect to the axle, means for supplying said complementary member with lubricant from the axle and delivery conduit means rigid with said knuckle and connecting said swivel unit to said bearings, the swivel unit being provided with lubricant conducting passageways, and in which said passageways are provided with proportioning restrictions.

14. In a motor vehicle, in combination, an axle, a front or steering wheel knuckle carrying bearings, a king pin for pivotal connection between said axle and said knuckle, and a lubricating installation comprising a swivel unit including an element coaxial with said king pin and movable with said knuckle, a complementary swivel element restrained against rotary displacement with respect to the axle, means for supplying said complementary member with lubricant from the axle and delivery conduit means extending downwardly along the knuckle structure and connecting said swivel unit and feeding the bearings carried by said knuckle.

15. In a vehicle of the type comprising an axle eye, a steering knuckle carrying a tie rod bearing, said knuckle having a clevis straddling said axle eye, a king pin rigid with said axle and constituting a pivot mount with a plurality of bearings for said knuckle and a brake having an operating cam shaft provided with bearings above the king pin; the combination therewith of a swivel unit having an inlet fixed with respect to the axle and mounted coaxially of the knuckle above the king pin and below the cam shaft, a complementary swivel element constituting an outlet, conduits connecting said complementary swivel element to said bearings, restriction passages in said fixed swivel element, one controlling flow to the king pin bearings, one to the tie rod bearing and the third to the cam shaft bearings, and means for feeding lubricant to said inlet.

16. In a front wheel construction of the type including a knuckle carrying bearings, a pin constituting a pivot bearing therefor, a brake element carried by said knuckle and mechanism for setting said brake element having a bearing on said knuckle; the combination therewith of lubricating means for said pivot bearing and said mechanism, said means comprising an inlet carried by the knuckle, and distributing duct means from said inlet, movable as a unit with the structural parts of the knuckle and leading to said knuckle bearings and said mechanism bearing.

17. In a front wheel construction of the type including a knuckle, a pin constituting a pivot bearing therefor, a tie rod bearing rigid with said knuckle, a brake element carried by said knuckle and a brake control bearing on said knuckle; the combination therewith of a distributor rigid with said knuckle and at the pivot axis thereof, an oil supply conduit leading lubricant to said distributor and having a swiveling connection with respect to said distributor, and duct means leading from said distributor along structural parts of the knuckle to said tie rod and pivot bearings and to said brake control bearing.

18. In a motor vehicle, in combination, an axle, a front wheel knuckle having a king pin pivot bearing on said axle, a brake drum on said knuckle, an operating shaft for the brake extending transversely from the chassis frame and having a bearing in said drum, said shaft including a universal joint bearing adjacent said pivot bearing, a bracket rigid with said bearing, a distributor fixed in said bracket and substantially coaxial with said king pin, a lubricant inlet member having a swiveling connection with respect to said distributor to permit steering displacement of said knuckle relative thereto, a conduit leading from said axle to said inlet fitting, and conduits from said distributor to said bearings.

Signed at New York in the county of New York and State of New York this 6 day of June, A. D. 1929.

JOSEPH BIJUR.